UNITED STATES PATENT OFFICE.

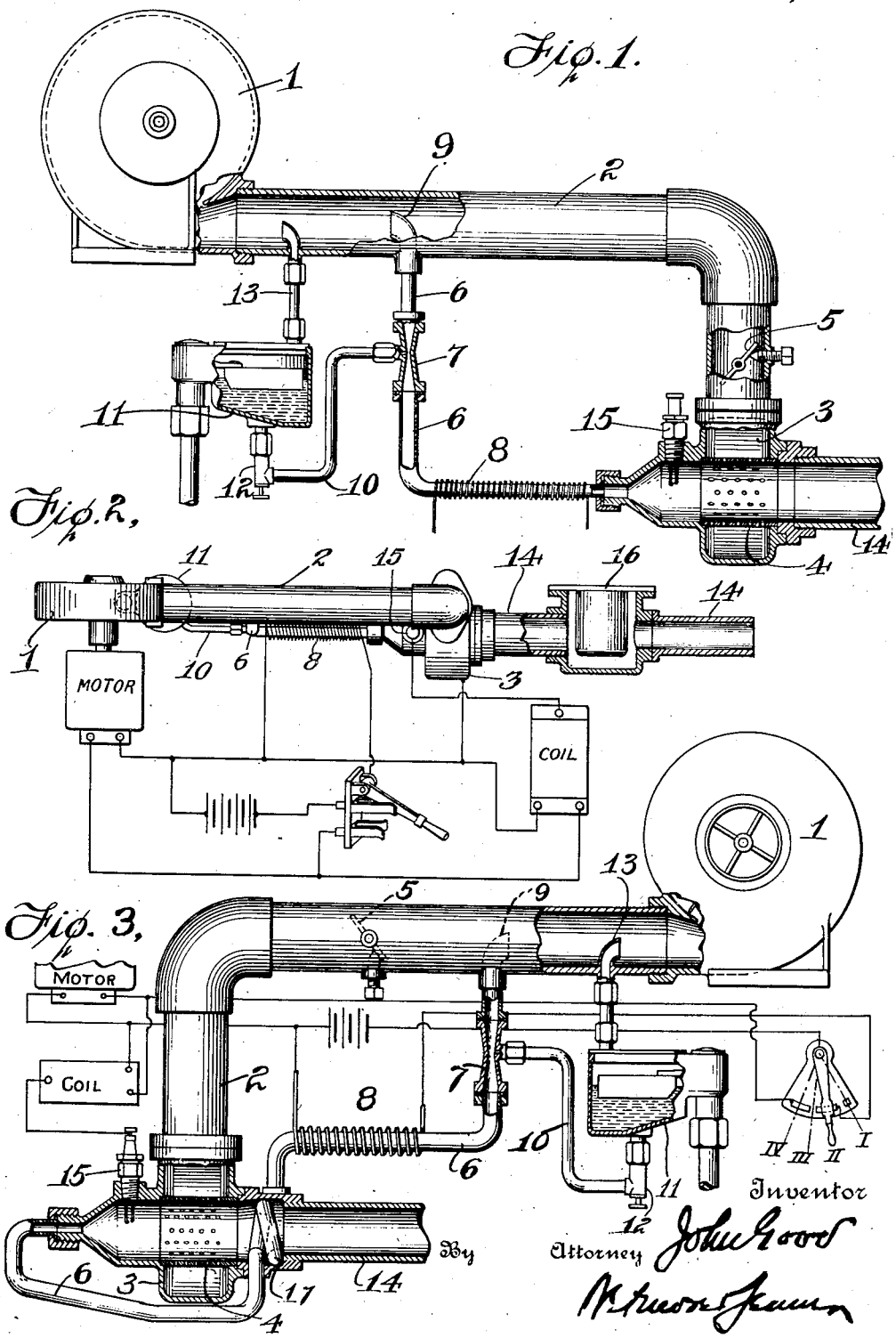

JOHN GOOD, OF BROOKLYN, NEW YORK, ASSIGNOR TO GOOD INVENTIONS CO., OF BROOKLYN, NEW YORK, A CORPORATION OF NEW YORK.

INCLOSED VAPOR-BURNER.

1,394,894. Specification of Letters Patent. Patented Oct. 25, 1921.

Application filed August 18, 1917. Serial No. 186,881.

*To all whom it may concern:*

Be it known that I, JOHN GOOD, a citizen of the United States, residing in the borough of Brooklyn, city and State of New York, have invented the following-described Improvements in Inclosed Vapor-Burners.

The invention is an inclosed vapor burner apparatus suitable for preheating the combustion charge mixture of combustion engines, or for other purposes where internal heat is desired but open flames are dangerous, and the invention consists in an organization of burner and operating elements whereby the mere closing of the switch of an electric motor suffices to start the apparatus in operation and maintain a steady non-explosive combustion for as long as the switch remains closed, and whereby other incidental and independent objects are attained, as will be made apparent below and more particularly defined in the claims.

In the drawings,

Figure 1 is a general elevation of the apparatus, with parts broken away;

Fig. 2, a top plan of Fig. 1 on smaller scale, showing the controlling circuits; and Fig. 3 is a modification adapted for economical continuous burning.

The apparatus is actuated in the case taken for illustration by an electric motor driving a fan blower 1, and contained in the circuit of a current source, such as indicated in Fig. 2, which may be the starting storage battery of an automobile. The fan 1 delivers air through the pipe 2, to the air admission chamber 3 of the burner head, where such air flows through the perforations in a cylindrical shell 4, by which it is distributed with substantial uniformity around the flame in the flame passage, as presently explained. The pressure produced by the fan in the pipe 2 and admission chamber may be, say, some two to seven inches of water, more or less, and a throttle 5 near the burner head serves as an adjustment of the flow. Part of the air from the fan is deflected into the line of tubing marked 6, and which includes a Venturi tube 7, and a vaporizer section inclosed in an electric heating coil 8. A sufficient air flow through this line of tubing is obtained by the cowl-shaped connection 9 of the tubing within the pipe 2, which connection is faced toward the fan. The velocity so produced in the tubing is to produce a pressure depression in the throat of the Venturi tube 7, which will suck up liquid fuel through the feed tube 10 from the constant level fuel supply or float chamber 11. A small valve 12 controls the flow through the tube 10, and a pressure connection 13 to the main air pipe 2, maintains a desirable proportional pressure on the liquid, as will be apparent. The mixture of liquid and air formed in the tube 7 is vaporized by passing through the heated part of the tubing within the coil 8, which part may take any desired form suited to the purposes of vaporizing the liquid fuel used so as to produce a very rich mixture of air and vaporized fuel. This mixture enters the burner head in the direction of the axis of the flame pipe 14 and of the axis of the shell 4, but before admixture with the air from the perforations in the latter, is intercepted by the spark between the elongated terminals of a spark plug 15 mounted in the upper wall of the burner head, and it is ignited by the spark before it is mixed with the air. The position of the throttle 5 and the adjustment of the liquid fuel flow are such as to prescribe a certain and very definite relation between the rate of fuel supply and the rate of supply of combustion-supporting air to the burner head, which, however, is easily ascertained, and when so adjusted the ignition and combustion will take place without explosion and hence with a maximum of useful heating effect. The resulting flame proceeds with high velocity through the flame tube and into impingement with the body 16 to be heated, which may be introduced in the flame passage or otherwise associated with it. The products of combustion escape from the end of the flame passage 14, which is open and hence does not create any appreciable back pressure to oppose the flow. The non-explosive result is produced by virtue, first, of the adjustment of the proportions of the fuel and air, which are those of an explosive mixture, and, second, by the manner of introducing and distributing combustion supporting air to the vapor jet, which is such as to prevent the formation of a mixture of the two inexplosive proportions in the region of the spark. It will be noted that the spark is disposed in the burner head about midway between the entrance of the vaporized fuel thereto and the air distributer 4, so that it is thus located where the vapor is still relatively undiluted with air and is rich enough in fuel to ignite locally but without rapid propagation of the flame. The avoidance of an explosive mixture at the spark thus avoids explosion in the burner head and it may be stated that this result is only attainable by a careful relative disposition of the vapor jet, the spark and the distributer of the combustion supporting air. The relative positions shown in the drawings are substantially accurate for the air pressure stated.

The heating coil 8 and the spark plug 15 are energized by the same battery that runs the fan motor and a suitable circuit arrangement is shown in Fig. 2, wherein it will be seen that the closing movement of the switch handle first closes the battery circuit through the heating coil 8 which gives an opportunity for that coil to become thoroughly hot before the motor is started. Further movement of the switch handle closes the circuit of the motor and the primary of the spark coil; thereby the respective flows of air and fuel are started, as above explained, the fuel is vaporized and enters the burner head, being ignited therein and immediately joined by the air from the distributer shell, the ignition and development of heat take place quietly and instantly, as the result of closing the switch, and combustion continues so long as the motor circuit is closed and within reasonable limits is in direct proportion to the motor speed.

For such temporary uses as preheating the vaporizers of automobile and boat engines, the consumption of energy by the heating coil, whether used for heating the air or the fuel, is not so heavy as to constitute a serious drain on the battery, but for continuous burning for long periods, the flame itself can be utilized for vaporizing the fuel and with consequent relief to the battery. Fig. 3 illustrates a means to this end. The fuel tubing 6 is passed through or in proximity to the flame passage, as, for example, by coiling it inside the junction between the flame pipe and burner head, as shown at 17. Otherwise, the organization of the apparatus may be the same as in Fig. 2, and the circuit connectors may also be the same, except that the switch handle now has four operating positions, marked I, II, III and IV, respectively. In position I the circuit from the battery is opened; in position II, the circuit of the electric heating coil 8 only is closed; in position III, both the heating coil and the motor and igniter circuits are closed, and in position IV the heater coil is cut out of action, the motor and igniter circuits remaining closed.

In both of the above described forms of the invention it will be noted that the fuel liquid is delivered in proportion to the air delivery and also that it is heated in the presence of some air, which fact conduces to its vaporization promptly and at a lower temperature than if it were heated by itself. The proportion of the air flow through the tubing 6 as compared to that through the main air pipe, is regulated by the throttle 5 in the present case, which represents a permanent adjustment, but it is likewise possible to establish such adjustment in the first instance by the proper selection of the size and number of the air holes in the distributer shell 4, and where such arrangement is used an improvement in the combustion will be found to result. The motor-driven fan represents a suitable means of creating an air flow into the mixing and ignition space, most convenient of use in conjunction with electric means for heating and vaporizing the liquid fuel.

The foregoing disclosure includes certain matter also disclosed in my copending application Serial No. 186,882, filed August 18, 1917, and therein claimed. The present invention relates to the class of vapor burners, that is to say, to burners in which the fuel is admitted to the combustion space, in vaporous form after ignition, and the following claims are to be understood as limited to that class.

I claim:

1. Electrically-ignited vapor burner apparatus comprising an ignition space containing an electric igniter, electrically heated means for supplying a rich mixture of vaporous fuel and air, an entrance for conducting such mixture into igniting relation to the igniter in said space, means for admitting air to sustain the flame resulting from the ignition of said mixture and means for coincidently causing said mixture and air to flow into said ignition space.

2. Vapor burner apparatus comprising, a closed ignition space and flame passage, an igniter in said space, means for causing the delivery to said space of a rich mixture of vaporous fuel and air, said means including an air passage, an electric heater and a supply of liquid fuel, and means for admitting air to said space in proportion to sustain the flame therein.

3. Vapor burner apparatus comprising, a closed ignition space, an igniter therein, electrically heated means for supplying a rich mixture of vaporous fuel and air, an entrance for conducting such mixture into igniting relation to the igniter in said space, means for causing the admission of air to sustain the resulting flame therein and a single air-flow-creating mechanism adapted for coincidently operating said mixture-supplying and air-admission means.

4. Vapor burner apparatus comprising, a closed ignition space and flame passage, an igniter mounted in said space, an air passage leading thereto and disposed in position to be heated thereby, means whereby liquid fuel is admitted to the air in said passage and a heater for said passage whereby said fuel may be vaporized in said space when starting the apparatus in action.

5. Vapor burner apparatus comprising an ignition space, an electric igniter mounted therein, an air passage leading to said space and disposed in position to be heated thereby, means whereby liquid fuel is admitted to the passage, an electric heater for said passage, means for coincidently energizing said igniter and heater and means for creating air flow through said passage to the ignition space.

6. In vapor burner apparatus of the kind described, an ignition space, an igniter mounted therein, an electric motor and means driven thereby for causing a flow of air into said space, a source of liquid fuel and connections for delivering fuel therefrom for mixture with said air flow prior to its entrance into said space, an electric heater adapted to vaporize the fuel liquid in said air flow, a common source of electric current for operating said motor and electric heater, and an igniter adapted to ignite the vaporized fuel in said space.

7. Vapor burning apparatus comprising a closed combustion space containing an igniter, an air-current-creating means supplying air to said space in quantity to complete combustion therein, a fuel passage supplied with fuel liquid and delivering fuel to said space by the effect of and in proportion to said air current, and means for heating said fuel passage and vaporizing said fuel liquid in transit to said space.

8. Vapor burning apparatus comprising a closed combustion space, air-current-creating means supplying air to said space in quantity to complete the combustion therein, a fuel passage connected with a source of liquid fuel and delivering fuel to said space by the effect of and in proportion to said air current, means for heating said passage to vaporize the fuel therein and an igniter disposed in said space to ignite the vapor from said passage prior to its complete mixture with said combustion-supporting air.

9. Vapor burner apparatus comprising a mixing and ignition space, electrically operated means for creating flow of air and fuel vapor into said space, electrically heated, vaporizing means by which fuel liquid is vaporized and through which it flows toward said space, an electric igniting means within said space, and means for conjointly supplying current to all said electrical means.

10. Vapor burner apparatus comprising an ignition and mixing space means for creating a vaporized mixture of fuel vapor and air containing less air than will support combustion of the vapor and admitting said rich mixture to said space, means for admitting air sufficient to complete combustion to said space, and an electric igniter located in said space at a point where the rich mixture has not produced an explosive medium with said combustion completing air.

11. Combustion apparatus comprising a flame passage, means for creating a flow of air thereto, means for creating a flow of mixed fuel and air thereto and a passage for said mixed fuel and air provided with an electrical vaporizer and with a part subject to the temperature in said flame passage.

12. Vapor burner apparatus comprising a mixing space having surrounding means for admitting air inwardly thereto toward the longitudinal axis of said space, means for heating and thereby vaporizing fuel liquid and admitting the same to said space, in the direction of said axis, an igniter in said space and means for coincidently operating said admission means and igniter.

13. Vapor burner apparatus comprising a mixing space, electric means for heating and thereby vaporizing liquid fuel, in the presence of air, means for creating a flow of the vapor and air to said space, an electric igniter in the space, a source of electric current and a switch mechanism for conjointly operating all said means.

14. Combustion apparatus comprising a mixing space, means for creating air flow thereto, a passage for such air flow including a Venturi tube a liquid fuel delivery to said tube and means for heating said passage between the point of delivery and said space.

15. Combustion apparatus comprising an ignition and mixing space containing an igniter and having an entrance for air and a passage conducting fuel vapor to said space, a liquid fuel receptacle connected to said passage, an air source delivering air to said entrance and passage and means for communicating the air pressure of said source to the said receptacle.

16. Combustion apparatus comprising a main air passage leading to a mixing space, a second passage leading air to said space, means whereby the air flow causes delivery of liquid fuel into said passage proportional to the volume thereof, means for vaporizing the fuel liquid in said passage in transit to said space and an igniter in said space.

17. Vapor burner apparatus comprising, a flame passage, heater means for vaporizing the fuel liquid, means for causing air flow to said passage, means whereby the air flow causes fuel to enter said passage, ignition means in said passage and means for causing conjoint operation of all of the aforesaid means.

18. Vapor burner apparatus comprising, in combination a mixing space surrounded by a perforated wall, means for causing air flow through the perforations in said wall to said mixing space, means for heating liquid fuel to convert it into vapor form and means for causing said vaporized fuel to flow into said space into mixing relation with the air from said perforations.

19. Vapor burner apparatus, comprising a closed ignition space and flame passage, electrically operated means for supplying combustion-supporting air to said space and electric means for heating and vaporizing liquid fuel and igniting the same therein, in combination with switch mechanism controlling said means and adapted to energize the fuel heating means in advance of the air supplying means.

20. Vapor burner apparatus comprising, in combination with a source of air pressure, an inclosed ignition space and flame passage, a main air pipe connecting the same to said source of air pressure, a second passage leading from said source to said space, means for mixing liquid fuel with the air in said second passage, means for heating and thereby vaporizing said fuel and electric means for igniting the vaporized fuel.

21. Inclosed combustion apparatus comprising, an ignition space, in combination with a main air passage leading thereto and a fuel and air tube leading from said passage, a closed flame passage, means for mixing liquid fuel with the air in said tube and means for heating and vaporizing said mixture in advance of its entry to said closed flame passage.

22. Combustion apparatus comprising, an ignition space and means for creating a flow of air mixed with liquid fuel in vaporized form into said space comprising an air passage including a Venturi tube, a source of liquid fuel having an outlet in said Venturi tube and means for heating said passage so as to vaporize the liquid.

23. Combustion apparatus comprising, an ignition space and means for creating a flow of air mixed with liquid fuel in vaporized form into said space, comprising an air passage subject to the heat produced in said space, independent means for heating said passage, a Venturi tube included in said passage and a liquid fuel source having its outlet in said Venturi tube.

24. Vapor burner apparatus comprising, an ignition space, air-flow-creating means, two entrances in said space admitting the air flow thereto, one of said entrances being connected with a source of liquid fuel and associated with an electric heater, an igniter in said space and a common source of electric energy for operating said igniter and electric heater.

In testimony whereof, I have signed this specification.

JOHN GOOD.